US012659869B2

(12) United States Patent
Sun et al.

(10) Patent No.: US 12,659,869 B2
(45) Date of Patent: Jun. 16, 2026

(54) POWER CONTROL PARAMETER INDICATION METHOD, TERMINAL, AND NETWORK SIDE DEVICE

(71) Applicant: VIVO MOBILE COMMUNICATION CO., LTD., Dongguan (CN)

(72) Inventors: Rongrong Sun, Dongguan (CN); Yang Song, Dongguan (CN); Hao Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 294 days.

(21) Appl. No.: 18/374,640

(22) Filed: Sep. 28, 2023

(65) Prior Publication Data
US 2024/0031941 A1      Jan. 25, 2024

Related U.S. Application Data

(63) Continuation of application No. PCT/CN2022/085108, filed on Apr. 2, 2022.

(30) Foreign Application Priority Data

Apr. 2, 2021    (CN) .......................... 202110362410.0

(51) Int. Cl.
*H04W 52/14* (2009.01)
*H04W 52/32* (2009.01)
*H04W 52/58* (2009.01)

(52) U.S. Cl.
CPC ....... *H04W 52/146* (2013.01); *H04W 52/325* (2013.01); *H04W 52/58* (2013.01)

(58) Field of Classification Search
CPC . H04W 52/146; H04W 52/325; H04W 52/58; H04W 52/322; H04W 52/143;
(Continued)

(56) References Cited

U.S. PATENT DOCUMENTS 12,225,534 B2* 2/2025 Kang .................... H04L 5/0055
2023/0292250 A1* 9/2023 Määttänen .......... H04W 52/242
(Continued)

FOREIGN PATENT DOCUMENTS

CN        110831135 A      2/2020
CN        111092710 A      5/2020
(Continued)

OTHER PUBLICATIONS

3GPP TSG-RAN WG1 Meeting #104-e e-Meeting, Jan. 25-Feb. 5, 2021, R-2101447, "Enhancements on Multi-TRP for PDCCH, PUCCH and PUSCH" (Year: 2021).*
(Continued)

*Primary Examiner* — Fayyaz Alam
(74) *Attorney, Agent, or Firm* — IPX PLLC

(57) ABSTRACT

This application discloses a power control parameter indication method, a terminal, and a network side device. The power control parameter indication method includes: receiving, by a terminal, downlink control information; and performing, by the terminal, power control according to the downlink control information, where the downlink control information includes at least one power control parameter indicator field, the power control parameter indicator field indicates first power control parameters of different PUSCH transmission occasions, and the PUSCH transmission occasion is associated with an SRS resource or SRS resource set.

18 Claims, 7 Drawing Sheets

Network side device

Terminal

Terminal

(58) Field of Classification Search

CPC .. H04W 52/242; H04L 5/0044; H04L 5/0048; H04L 5/0053

See application file for complete search history.

(56) References Cited

U.S. PATENT DOCUMENTS

| | | | | |
|---|---|---|---|---|
| 2024/0306015 A1* | 9/2024 | Matsumura | ........... | H04L 5/0053 |
| 2024/0381266 A1* | 11/2024 | Ling | ..................... | H04W 52/08 |
| 2024/0397451 A1* | 11/2024 | Gao | ...................... | H04W 52/04 |
| 2025/0024461 A1* | 1/2025 | Jeon | .................... | H04W 52/146 |

FOREIGN PATENT DOCUMENTS

| | | | |
|---|---|---|---|
| CN | 111901021 A | 11/2020 |
| EP | 4057560 A1 | 9/2022 |
| WO | 2021026683 A1 | 2/2021 |

OTHER PUBLICATIONS

Extended European Search Report issued in related European Application No. 22779177.9, mailed Aug. 21, 2024, 10 pages.

ZTE: "Enhancements on Multi-TRP for PDCCH, PUCCH and PUSCH", 3GPP Draft; R1-2100286, Jan. 2021, 25 pages.

"3rd Generation Partnership Project; Technical Specification Group RadioAccess Network; NR; Medium Access Control (MAC) protocol specification (Release 16)", 3GPP Standard; Technical Specification; 3GPP TS 38.321, vol. RAN WG2, No. V16.4.0 Mar. 29, 2021, pp. 1-157, XP052000122.

ZTE: "Enhancements on multi-beam operation", 3GPP Draft; R1-1910285, Oct. 2019, 25 pages.

Motorola: "PDCCH Formats (A) for Scheduling Grants", 3GPP Draft; R1-074587, Oct. 2007, 4 pages.

International Search Report issued in corresponding International Application No. PCT/CN2022/085108, mailed Jun. 27, 2022, 4 pages.

Qualcomm Incorporated, "Enhancements on Multi-TRP for PDCCH, PUCCH and PUSCH", 3GPP TSG-RAN WG1 Meeting #104-e R1-2101447, Jan. 2021, 28 pages.

Vivo, "Enhancements on Multi-TRP for PDCCH, PUCCH and PUSCH", 3GPP TSG RAN WG1 #104-e, R1-2100422, Jan. 2021, 28 pages.

* cited by examiner

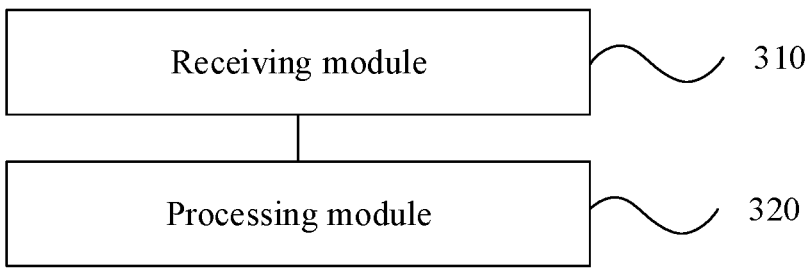

FIG. 3

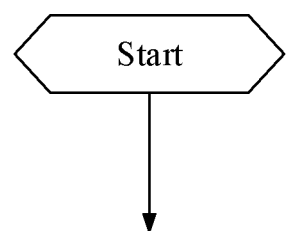

Send downlink control information, where the
downlink control information includes at least one
power control parameter indicator field, the power
control parameter indicator field indicates first
power control parameters of different physical
uplink shared channel PUSCH transmission
occasions, and the PUSCH transmission occasion is
associated with an SRS resource or SRS resource set
<span></span>

401

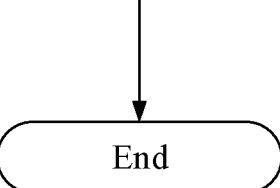

FIG. 4

| S | Serving base station ID | BWP ID | Oct 1 |

| R | C | PUSCH path loss identifier | Oct 2 |

| SRI $ID_0$ | SRI $ID_1$ | Oct 3 |

SRI $ID_{2L-6}$     SRI $ID_{2L-5}$       Oct L

| SRI $ID_{2L-6}$ | SRI $ID_{2L-5}$ | Oct L |

POWER CONTROL PARAMETER INDICATION METHOD, TERMINAL, AND NETWORK SIDE DEVICE

CROSS-REFERENCE TO RELATED APPLICATIONS

This application is a continuation of International Application No. PCT/CN2022/085108, filed Apr. 2, 2022, which claims priority to Chinese Patent Application No. 202110362410.0, filed Apr. 2, 2021. The entire contents of each of the above-referenced applications are expressly incorporated herein by reference.

TECHNICAL FIELD

This application relates to the field of communication technologies, and specifically relates to a power control parameter indication method, a terminal, and a network side device.

BACKGROUND

In a multi-Transmitting Receiving Point (TRP) scenario, different transmission occasions of Physical Uplink Shared Channel (PUSCH) may correspond to multi-TRP transmission. To meet target receive power requirements of different TRPs, a network side device needs to configure a plurality of sets of power control parameters for a terminal for transmit power calculation of PUSCH transmission occasions.

However, currently, an open-loop power control set indicator field that is used to indicate an open-loop power control parameter set in downlink control information only can indicate a power control parameter set of one TRP. Consequently, an existing power control parameter indication cannot be applied to a multi-TRP transmission scenario.

SUMMARY

Embodiments of this application provide a power control parameter indication method, a terminal, and a network side device.

According to a first aspect, a power control parameter indication method is provided, including:

receiving, by a terminal, downlink control information; and performing, by the terminal, power control according to the downlink control information, where the downlink control information includes at least one power control parameter indicator field, the power control parameter indicator field indicates first power control parameters of different physical uplink shared channel PUSCH transmission occasions, and the PUSCH transmission occasion is associated with a sounding reference signal SRS resource or SRS resource set.

According to a second aspect, a power control parameter indication apparatus is provided, including:

a receiving module, configured to receive downlink control information; and a processing module, configured to perform power control according to the downlink control information, where the downlink control information includes at least one power control parameter indicator field, the power control parameter indicator field indicates first power control parameters of different physical uplink shared channel PUSCH transmission occasions, and the PUSCH transmission occasion is associated with a sounding reference signal SRS resource or SRS resource set.

According to a third aspect, a power control parameter indication method is provided, including:

sending, by a network side device, downlink control information, where the downlink control information includes at least one power control parameter indicator field, the power control parameter indicator field indicates first power control parameters of different physical uplink shared channel PUSCH transmission occasions, and the PUSCH transmission occasion is associated with an SRS resource or SRS resource set.

According to a fourth aspect, a power control parameter indication apparatus is provided, including:

a sending module, configured to send downlink control information, where the downlink control information includes at least one power control parameter indicator field, the power control parameter indicator field indicates first power control parameters of different physical uplink shared channel PUSCH transmission occasions, and the PUSCH transmission occasion is associated with an SRS resource or SRS resource set.

According to a fifth aspect, a terminal is provided. The terminal includes a processor, a memory, and a program or an instruction that is stored in the memory and that can be run on the processor, where the program or the instruction is executed by the processor to implement the steps of the method in the first aspect.

According to a sixth aspect, a terminal is provided, including a processor and a communication interface, where the communication interface is configured to receive downlink control information; and the processor is configured to perform power control according to the downlink control information, where the downlink control information includes at least one power control parameter indicator field, the power control parameter indicator field indicates first power control parameters of different physical uplink shared channel PUSCH transmission occasions, and the PUSCH transmission occasion is associated with a sounding reference signal SRS resource or SRS resource set.

According to a seventh aspect, a network side device is provided. The network side device includes a processor, a memory, and a program or an instruction that is stored in the memory and that can be run on the processor, where the program or the instruction is executed by the processor to implement the steps of the method in the third aspect.

According to an eighth aspect, a network side device is provided, including a processor and a communication interface, where the communication interface is configured to send downlink control information, where the downlink control information includes at least one power control parameter indicator field, the power control parameter indicator field indicates first power control parameters of different physical uplink shared channel PUSCH transmission occasions, and the PUSCH transmission occasion is associated with an SRS resource or SRS resource set.

According to a ninth aspect, a readable storage medium is provided, where a program or an instruction is stored on the readable storage medium, and the program or the instruction is executed by a processor to implement the steps of the method in the first aspect or the steps of the method in the third aspect.

According to a tenth aspect, a chip is provided, where the chip includes a processor and a communication interface, the communication interface is coupled to the processor, and the processor is configured to run a program or an instruction to implement the method in the first aspect or the method in the third aspect.

According to an eleventh aspect, a computer program/ program product is provided, where the computer program/ program product is stored in a non-volatile storage medium, and the program/program product is executed by at least one processor to implement the method in the first aspect or the steps of the method in the third aspect.

In the embodiments of this application, the DCI received by the terminal comprises at least one power control parameter indicator field, the power control parameter indicator field indicates first power control parameters of different PUSCH transmission occasions, and the PUSCH transmission occasion is associated with an SRS resource or SRS resource set. In this way, with reference to a correspondence between a TRP and an SRS resource or SRS resource set, when there are a plurality of TRPs, first power control parameters of PUSCH transmission occasions of the plurality of TRPs can be indicated by the DCI including the at least one power control parameter indicator field, so that transmission requirements of the plurality of TRPs can be met.

BRIEF DESCRIPTION OF DRAWINGS

FIG. 3 is a structural diagram of an apparatus corresponding to FIG. 2;

FIG. 4 is a second flowchart of a power control parameter indication method according to an embodiment of this application;

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "I" generally represents an "or" relationship between associated objects.

It should be noted that, the technologies described in the embodiments of this application are not limited to a Long Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a New Radio (NR) system for example purposes, and NR terms are used in most of the following descriptions, but these technologies can also be applied to an application other than an NR system application, for example, a $6^{th}$ generation (6G) communication system.

Figure 1:
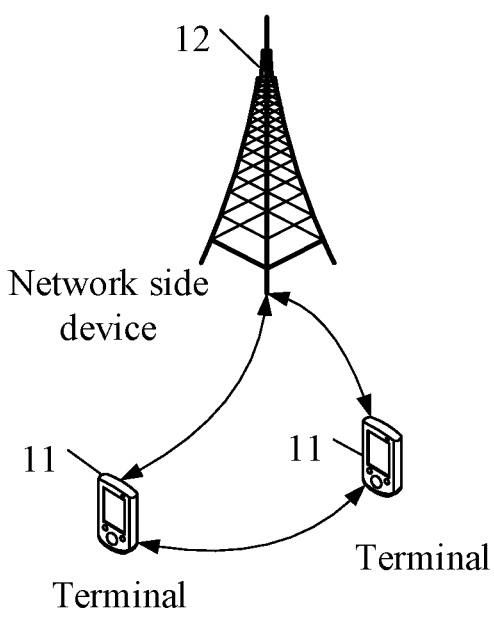
FIG. 1 is a block diagram of a wireless communication system.

FIG. 1 is a block diagram of a wireless communication system to which embodiments of this application can be applied. The wireless communication system includes a terminal 11 and a network side device 12. The terminal 11 may also be referred to as a terminal device or User Equipment (UE). The terminal 11 may be a terminal side device such as a mobile phone, a tablet personal computer, a laptop computer or a notebook computer, a Personal Digital Assistant (PDA), a palmtop computer, a netbook, an ultra-mobile personal computer (UMPC), a Mobile Internet Device (MID), a wearable device, vehicle user equipment (VUE), or pedestrian user equipment (PUE). The wearable device includes a smart watch, a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, a Transmitting Receiving Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, a power control parameter indication method provided in the embodiments of this application is described in detail by using some embodiments and application scenarios.

Figure 2:
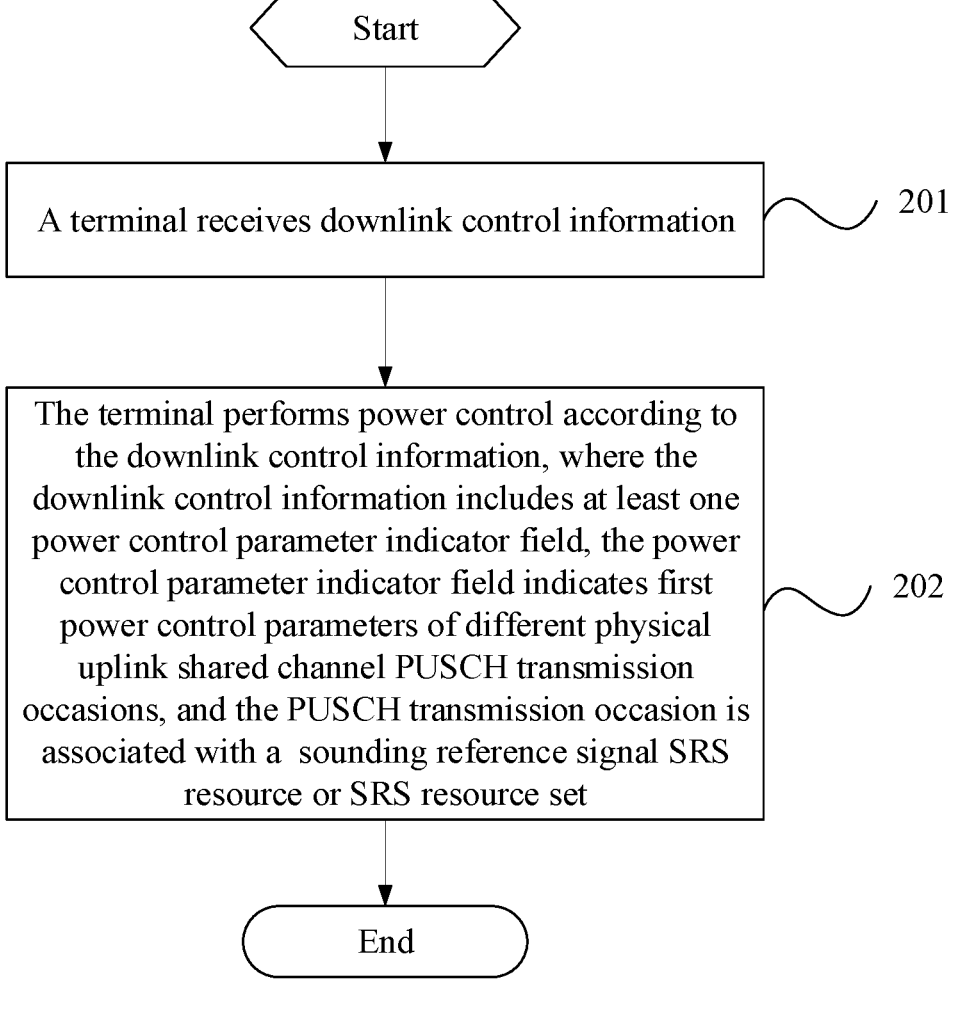
FIG. 2 is a first flowchart of a power control parameter indication method according to an embodiment of this application.

As shown in FIG. 2, an embodiment of this application provides a power control parameter indication method, including:

Step 201: A terminal receives downlink control information.

Step 202: The terminal performs power control according to the downlink control information, where the downlink control information includes at least one power control parameter indicator field, the power control parameter indicator field indicates first power control parameters of different physical uplink shared channel PUSCH transmission occasions, and the PUSCH transmission occasion is associated with a Sounding Reference Signal (SRS) resource or SRS resource set.

Herein, the Downlink Control Information (DCI) received by the terminal includes at least one power control parameter indicator field, the power control parameter indicator field indicates first power control parameters of different PUSCH transmission occasions, and the PUSCH transmission occasion is associated with an SRS resource or SRS resource set. In this way, with reference to a correspondence between a TRP and an SRS resource or SRS resource set (that is, each TRP has a corresponding SRS resource or SRS resource set), when there are a plurality of TRPs, first power control parameters of PUSCH transmission occasions of the plurality of TRPs can be indicated by the DCI including the at least one power control parameter indicator field, so that transmission requirements of the plurality of TRPs can be met.

The SRS resource set is a plurality of (a group of) SRS resources. In some embodiments, the power control parameter indicator field may also be understood as an open-loop power control parameter set indicator field. Correspondingly, the first power control parameter is a power control parameter P0 used to determine a transmit power. In the following embodiment, the first power control parameter may be directly replaced with P0. Another implementation of the first power control parameter may also be applied to this embodiment of this application. Details are not described herein again.

In some embodiments, SRS resources or SRS resource sets associated with the different PUSCH transmission occasions are different.

It should be learned that different SRS resources or SRS resource sets are applied to different TRPs. Therefore, when the SRS resources or SRS resource sets associated with the different PUSCH transmission occasions are different, one power control parameter indicator field can indicate first power control parameters of PUSCH transmission occasions for different TRPs.

In this way, for indication of P0 for PUSCH transmission occasions of a plurality of TRPs such as a TRP 1, a TRP 2, a TRP 3, and a TRP 4, because an SRS resource or SRS resource set of each TRP is different, two power control parameter indicator fields in the DCI may be used to indicate P0 for different PUSCH transmission occasions. For example, a power control parameter indicator field 1 indicates P0 for PUSCH transmission occasions of the TRP 1 and the TRP 2, and a power control parameter indicator field 2 indicates P0 for PUSCH transmission occasions of the TRP 3 and the TRP 4. Only one power control parameter indicator field may be used to indicate P0 for the PUSCH transmission occasions of the TRP 1, the TRP 2, the TRP 3, and the TRP 4.

It should be further learned that the PUSCH transmission occasion may be a slot, a nominal repeat transmission occasion, an actual repeat transmission occasion, a plurality of consecutive OFDM symbols, or the like.

In some embodiments, the downlink control information further includes an SRS resource indicator (SRI) field, and the SRI field indicates a candidate parameter set of a first power control parameter of a PUSCH transmission occasion associated with an SRS resource or SRS resource set.

That is, the DCI may further include the SRI field, which is used to indicate a candidate parameter set of a first power control parameter of a PUSCH transmission occasion associated with an SRS resource or SRS resource set.

In some embodiments, a candidate parameter set of a first power control parameter of at least one PUSCH transmission occasion in the different PUSCH transmission occasions is predefined or preconfigured.

In other words, a first power control parameter or at least one first power control parameter indicated by the power control parameter indicator field belongs to a predefined or preconfigured candidate parameter set. Correspondingly, the DCI does not include any SRI field or includes only one SRI field.

In some embodiments, the candidate parameter set includes at least one of the following:

a first candidate set; or a second candidate set, where the first candidate set belongs to a first set list, and the second candidate set belongs to a second set list.

In this way, the candidate parameter set of the first power control parameter may be a set that belongs only to the first set list, may be a set that belongs only to the second set list, or may include both a set that belongs to the first set list and a set that belongs to the second set list.

It should be noted that, in this embodiment, the first set list and the second set list are set to determine the candidate parameter set, so as to obtain the first power control parameter. Herein, each set in the first set list and the second set list includes a first power control parameter. However, the first set list is different from the second set list. Each set in the first set list includes another power control parameter such as alpha, a path loss reference signal, and a closed-loop power adjustment index in addition to the first power control parameter, but each set in the second set list is a set dedicated to the first power control parameter, and does not include another power control parameter. In some embodiments, the first set list may be an SRI-PUSCH mapping power control parameter add update list sri-PUSCH-MappingToAddMod-List or a P0-alpha set list P0-AlphaSets, and the second set list may be an open-loop power control parameter set list p0-PUSCH-SetList-r16.

In some embodiments, the first set list and the second set list each may include one or more lists. In this embodiment, the first set list and the second set list are configured or predefined by using higher layer signaling.

In some embodiments, the first set list and the second set list are respectively associated with SRS resource sets.

The first set list and the second set list may be associated with a same SRS resource set, or may be associated with different SRS resource sets.

Herein, SRS resource sets correspond to different TRPs. For example, an SRS resource or SRS resource set in an SRS resource set 1 corresponding to a TRP 1 is used for transmission of the TRP 1, and an SRS resource or SRS resource set in an SRS resource set 2 corresponding to a TRP 2 is used for transmission of the TRP 2. Therefore, the first set list may be a first set list associated with the SRS resource set 1, and the second set list may be a second set list associated with the SRS resource set 1. In some embodiments, the first set list and the second set list may be respectively associated with different SRS resource sets, which are not listed exhaustively herein.

An SRS resource set is configured by Radio Resource Control (RRC), and includes a plurality of SRS resources.

An SRS resource set is indicated by the SRI field and is a subset of all SRS resources in the SRS resource set.

In this embodiment, there may be one or more sets (that is, first parameter sets) in the first set list, and there may be one or more sets (that is, second parameter sets) in the second set list.

Therefore, for the candidate parameter set indicated by the SRI field, by using an arrangement sequence or an index value, a specified first parameter set in the first set list, for example, a $1^{st}$ first parameter set or a first parameter set whose index value is 0 or a first parameter set with a smallest index value is indicated when the candidate parameter set is the first candidate set; or a specified second parameter set in the second set list, for example, a $1^{st}$ second parameter set or a second parameter set whose index value is 0, or a second parameter set with a smallest index value is indicated when the candidate parameter set is the second candidate set.

For the predefined or preconfigured candidate parameter set, by using an arrangement sequence or an index value, a corresponding arrangement sequence or index value of the candidate parameter set in the first set list is predefined or preconfigured when the candidate parameter set is the first candidate set; or a corresponding arrangement sequence or index value of the candidate parameter set in the second set list is predefined or preconfigured when the candidate parameter set is the second candidate set.

It should be noted that in this embodiment, after receiving the DCI, the terminal needs to first determine the candidate parameter set to determine P0 for the PUSCH transmission occasion.

For a case that the first set list and the second set list are configured or predefined by using higher layer signaling, in some embodiments, the determined candidate parameter set includes the first candidate set and the second candidate set. For example, if an SRS resource or SRS resource set belongs to an SRS resource set 1, for a PUSCH transmission occasion associated with the SRS resource or SRS resource set in the SRS resource set 1, the first candidate set may be indicated in the first set list by an SRI field of the associated SRS resource set 1 in the DCI, or may be selected in the first set list in predefined or preconfigured manner; and the second candidate set may be indicated in the second set list by an SRI field of the associated SRS resource set 1 in the DCI, or may be selected in the second set list in a predefined or preconfigured manner. Then, the target parameter set is further determined from the first candidate set and the second candidate set to obtain the first power control parameter. If an SRS resource or SRS resource set belongs to an SRS resource set 2, for a PUSCH transmission occasion associated with the SRS resource or SRS resource set in the SRS resource set 2, the foregoing manner may also be used to determine the first candidate set and the second candidate set.

In some embodiments, a first candidate set of a first power control parameter of the PUSCH transmission occasion associated with the SRS resource or SRS resource set in the SRS resource set 1 is a set 1, a first candidate set of a first power control parameter of the PUSCH transmission occasion associated with the SRS resource or SRS resource set in the SRS resource set 2 is a set 2, and a first set list to which the set 1 belongs may be the same or different that to which the set 2 belongs.

Different PUSCH transmission occasions of different SRS resources or SRS resource sets are associated, and candidate parameter sets of P0 for the different PUSCH transmission occasions may be different sets in a same set list. In the foregoing example, for the PUSCH transmission occasion associated with the SRS resource or SRS resource set in the SRS resource set 1, it is assumed that the first candidate set is a 1st set in the first set list, and the second candidate set is a set with a smallest index value in the second set list. In this case, for the PUSCH transmission occasion associated with the SRS resource or SRS resource set in the SRS resource set 2, the first candidate set may be indicated in the first set list by the SRI field of the associated SRS resource set 2 in the DCI, or may be selected in the first set list in a predefined or preconfigured manner, and it is determined in this case that the first candidate set is a 2nd set in the first set list; and the second candidate set may be indicated in the second set list by the SRI field of the associated SRS resource set 2 in the DCI, or is selected in the second set list in a predefined or preconfigured manner, and it is determined in this case that the second candidate set is a set with a second smallest index value in the second set list.

In some embodiments, different PUSCH transmission occasions of different SRS resources or SRS resource sets are associated, and candidate parameter sets of P0 for the different PUSCH transmission occasions may be a same set in a same set list. Details are not described herein again.

In some embodiments, a bit size of the power control parameter indicator field is 3 bits.

In this case, the power control parameter indicator field whose bit size is 3 bits indicates a first power control parameter of a first PUSCH transmission occasion and a first power control parameter of a second PUSCH transmission occasion.

In some embodiments, if the power control parameter indicator field needs to indicate first power control parameters of PUSCH transmission occasions associated with two or more different SRS resources or resource sets, a quantity of bits in the power control parameter indicator field is M, where M may be a quantity of different SRS resources or resource sets plus 1, or a quantity of SRS resource sets used for codebook or non-codebook transmission plus 1.

In some embodiments, when the bit size of the power control parameter indicator field is 3 bits, in a case that the downlink control information does not include an SRI field, a first bit in the power control parameter indicator field indicates that a first target parameter set is a target candidate set, the target candidate set belongs to a first target set list, and the first target parameter set is a target parameter set of the first power control parameters of the different PUSCH transmission occasions;

a second bit in the power control parameter indicator field indicates a power control parameter that is in the current target candidate set and that is used as a first power control parameter of a first PUSCH transmission occasion when the current target candidate set indicated by the first bit belongs to a second set list, and an SRS resource or SRS resource set associated with the first PUSCH transmission occasion belongs to a first SRS resource set; and a third bit in the power control parameter indicator field indicates a power control parameter that is in the current target candidate set and that is used as a first power control parameter of a second PUSCH transmission occasion when the current target candidate set indicated by the first bit belongs to the second set list, and an SRS resource or SRS resource set associated with the second PUSCH transmission occasion belongs to a second SRS resource set.

A first target set list to which a target candidate set corresponding to the first PUSCH transmission occasion belongs is the same as a first target set list to which a target candidate set corresponding to the second PUSCH transmission occasion belongs.

In some embodiments, a first target set list to which a target candidate set corresponding to the first PUSCH transmission occasion belongs is different from a first target set list to which a target candidate set corresponding to the second PUSCH transmission occasion belongs.

Herein, the first target set list may be the first set list or may be the second set list.

That the DCI does not include an SRI field may also be understood as: all SRI fields in the DCI are 0 bits. Because the DCI does not include the SRI field, candidate parameter sets of the first power control parameter of the first PUSCH transmission occasion and the first power control parameter of the second PUSCH transmission occasion are determined in a predefined or preconfigured manner.

Because the candidate parameter set may include the first candidate set and the second candidate set, for the first power control parameter, the target candidate set in the first candidate set and the second candidate set needs to be further determined as the target parameter set, to determine the first power control parameter of the PUSCH transmission occasion in the target parameter set.

In this case, in the 3-bit power control parameter indicator field, the first bit indicates that the first target parameter set is the target candidate set, and the target candidate set belongs to the first target set list. The first target parameter set is the target parameter set of the first power control parameters of the different PUSCH transmission occasions, that is, the first power control parameters that are of the first PUSCH transmission occasion and the second PUSCH transmission occasion and that are indicated by the power control parameter indicator field, or a set belongs to the first set list or a set belongs to the second set list. For example, "0" indicates that the first target parameter set belongs to the first set list, and "1" indicates that the first target parameter set belongs to the second set list.

It should be understood that target candidate sets of the first power control parameters of the different PUSCH transmission occasions may be different sets in the first set list even if all the target candidate sets belong to the first set list. Similarly, target parameter sets of the first power control parameters of the different PUSCH transmission occasions may be different sets in the second set list even if all the target parameter sets belong to the second set list. That is, a list 1 to which the target candidate set corresponding to the first PUSCH transmission occasion belongs and a list 2 to which the target candidate set corresponding to the second PUSCH transmission occasion belongs may be a same set list, or may be different set lists.

The second bit indicates the first power control parameter (first target P0) of the first PUSCH transmission occasion (a PUSCH transmission occasion associated with the SRS resource or SRS resource set in the first SRS resource set) is which one in the second candidate set when the current target candidate set indicated by the first bit belongs to the second set list. For example, "0" indicates that the first target P0 is 1st P0 in the set, and "1" indicates that the first target P0 is 2nd P0 in the set. In this case, a first candidate set of the first power control parameter of the first PUSCH transmission occasion is not used to determine the first target P0. Herein, the current target candidate set is a target candidate set of the first power control parameter of the first PUSCH transmission occasion.

The third bit indicates the first power control parameter (second target P0) of the second PUSCH transmission occasion (a PUSCH transmission occasion associated with the SRS resource or SRS resource set in the second SRS resource set) is which one in the second candidate set when the current target candidate set indicated by the first bit belongs to the second set list. For example, "0" indicates that the second target P0 is 1st P0 in the set, and "1" indicates that the second target P0 is 2nd P0 in the set. In this case, a first candidate set of the first power control parameter of the second PUSCH transmission occasion is not used to determine the second target P0. Herein, the current target candidate set is a target candidate set of the first power control parameter of the second PUSCH transmission occasion.

For the first candidate set, considering that each set in the first set list may include only one P0, in a case that the first bit indicates that the first target parameter set is the first candidate set, the second bit and the third bit have no specific meaning. In some embodiments, if each set in the first set list includes a plurality of P0, the first power control parameter of the first PUSCH transmission occasion and the first power control parameter of the second PUSCH transmission occasion are further determined in a preconfigured or a predefined manner.

In some embodiments, the first bit is a most significant bit in the power control parameter indicator field.

In some embodiments, specific values of the 3 bits in the power control parameter indicator field are different, and an understanding of the terminal is shown in the following Table 1, Table 2, or Table 3, where a target first parameter set is a set belonging to the first set list, and a target second parameter set is a set belonging to the second set list.

TABLE 1

| Value of a target field | Target P0 for the PUSCH transmission occasion associated with the SRS resource or SRS resource set in the first SRS resource set | Target P0 for the PUSCH transmission occasion associated with the SRS resource or SRS resource set in the second SRS resource set |
|---|---|---|
| 000 | P0 in the target first parameter set | P0 in the target first parameter set |
| 001 | P0 in the target first parameter set | P0 in the target first parameter set |
| 010 | P0 in the target first parameter set | P0 in the target first parameter set |
| 011 | P0 in the target first parameter set | P0 in the target first parameter set |
| 100 | 1st P0 in the target second parameter set | 1st P0 in the target second parameter set |
| 101 | 1st P0 in the target second parameter set | 2nd P0 in the target second parameter set |
| 110 | 2nd P0 in the target second parameter set | 1st P0 in the target second parameter set |
| 111 | 2nd P0 in the target second parameter set | 2nd P0 in the target second parameter set |

TABLE 2

| Value of a target field | Target P0 for the PUSCH transmission occasion associated with the SRS resource or SRS resource set in the first SRS resource set | Target P0 for the PUSCH transmission occasion associated with the SRS resource or SRS resource set in the second SRS resource set |
|---|---|---|
| 000 | P0 in the target first parameter set | P0 in the target first parameter set |
| 001 | — | — |
| 010 | — | — |
| 011 | — | — |
| 100 | 1st P0 in the target second parameter set | 1st P0 in the target second parameter set |

TABLE 2-continued

| Value of a target field | Target P0 for the PUSCH transmission occasion associated with the SRS resource or SRS resource set in the first SRS resource set | Target P0 for the PUSCH transmission occasion associated with the SRS resource or SRS resource set in the second SRS resource set |
|---|---|---|
| 101 | 1st P0 in the target second parameter set | 2nd P0 in the target second parameter set |
| 110 | 2nd P0 in the target second parameter set | 1st P0 in the target second parameter set |
| 111 | 2nd P0 in the target second parameter set | 2nd P0 in the target second parameter set |

TABLE 3

| | Value of a target field | | |
|---|---|---|---|
| | First bit | Second bit | Third bit |
| 0 | Target P0 corresponding to all PUSCH transmission occasions belongs to P0 in the target first parameter set | Target P0 for the PUSCH transmission occasion associated with the SRS resource or SRS resource set in the first SRS resource set is 1st P0 in the target second parameter set | Target P0 for the PUSCH transmission occasion associated with the SRS resource or SRS resource set in the second SRS resource set is 1st P0 in the target second parameter set |
| 1 | Target P0 corresponding to all PUSCH transmission occasions belongs to P0 in the target first parameter set | Target P0 for the PUSCH transmission occasion associated with the SRS resource or SRS resource set in the first SRS resource set is 2nd P0 in the target second parameter set | Target P0 for the PUSCH transmission occasion associated with the SRS resource or SRS resource set in the second SRS resource set is 2nd P0 in the target second parameter set |

In the implementation in Table 3, the terminal first interprets the first bit in the power control parameter indicator field, and then interprets the last two bits when the first bit is 1.

In the foregoing Tables 1 to 3, the target first parameter set and the target second parameter set may be determined as follows:

Example 1: A network side device configures one first set list p0-AlphaSets. For the PUSCH transmission occasion associated with the SRS resource or SRS resource set in the first SRS resource set, the target first parameter set corresponds to a 1st first parameter set P0-PUSCH-AlphaSet in the p0-AlphaSets, and for the PUSCH transmission occasion associated with the SRS resource or SRS resource set in the second SRS resource set, the target first parameter set corresponds to a 2nd first parameter set P0-PUSCH-AlphaSet in the p0-AlphaSets. In addition, the network side device configures one second set list p0-PUSCH-SetList-r16. For the PUSCH transmission occasion associated with the SRS resource or SRS resource set in the first SRS resource set, the target second parameter set corresponds to P0-PUSCH-Set-r16 with a smallest index value (p0-PUSCH-SetId-r16) in the p0-PUSCH-SetList-r16, and for the PUSCH transmission occasion associated with the SRS resource or SRS resource set in the second SRS resource set, the target second parameter set corresponds to p0-PUSCH-SetList-r16 with second smallest p0-PUSCH-SetId-r16 in the p0-PUSCH-SetList-r16.

Example 2: A network side device configures two first set lists sri-PUSCH-MappingToAddModList1 and sri-PUSCH-MappingToAddModList2, which are respectively associated with the first SRS resource set and the second SRS resource set. For the PUSCH transmission occasion associated with the SRS resource or SRS resource set in the first SRS resource set, the target first parameter set corresponds to a 1st first parameter set SRI-PUSCH-PowerControl in the sri-PUSCH-MappingToAddModList1, or a first parameter set SRI-PUSCH-PowerControl in sri-PUSCH-PowerControlI=0, and for the PUSCH transmission occasion associated with the SRS resource or SRS resource set in the second SRS resource set, the target first parameter set corresponds to a 1st first parameter set SRI-PUSCH-PowerControl in the PUSCH-MappingToAddModList2, or a first parameter set SRI-PUSCH-PowerControl in sri-PUSCH-PowerControII=0, or a first parameter set SRI-PUSCH-PowerControl in sri-PUSCH-PowerControU=1. In addition, the network side device configures two second set lists p0-PUSCH-SetList-r16 1 and p0-PUSCH-SetList-r16 2, which are respectively associated with the first SRS resource set and the second SRS resource set. For the PUSCH transmission occasion associated with the SRS resource or SRS resource set in the first SRS resource set, the target second parameter set corresponds to P0-PUSCH-Set-r16 with smallest p0-PUSCH-SetId-r16 in the p0-PUSCH-SetList-r16 1, and for the PUSCH transmission occasion associated with the SRS resource or SRS resource set in the second SRS resource set, the target second parameter set corresponds to P0-PUSCH-Set-r16 with smallest p0-PUSCH-SetId-r16 in the p0-PUSCH-SetList-r16 2.

In addition, in some embodiments, when the bit size of the power control parameter indicator field is 3 bits, in a case that the downlink control information includes one SRI field, if the SRI field is associated with a first SRS resource set, a first bit in the power control parameter indicator field indicates a first power control parameter of a PUSCH transmission occasion associated with a first SRS resource or SRS resource set, and a second bit and a third bit jointly indicate a first power control parameter of a PUSCH transmission occasion associated with a second SRS resource or SRS resource set; or if the SRI field is associated with a second SRS resource set, a first bit and a second bit in the power control parameter indicator field jointly indicate a first power control parameter of a PUSCH transmission occasion associated with a first SRS resource or SRS resource set, and a third bit indicates a first power control parameter of a PUSCH transmission occasion associated with a second SRS resource or SRS resource set, where the first SRS resource or SRS resource set belongs to the first SRS resource set, and the second SRS resource or SRS resource set belongs to the second SRS resource set.

Because the SRS resource or SRS resource set associated with the first PUSCH transmission occasion belongs to the first SRS resource set, the SRS resource or SRS resource set associated with the first PUSCH transmission occasion is the first SRS resource or SRS resource set. If the SRS resource or SRS resource set associated with the second PUSCH transmission occasion belongs to the second SRS resource set, the SRS resource or SRS resource set associated with the second PUSCH transmission occasion is the second SRS resource or SRS resource set.

Therefore, for a case that the DCI includes one SRI field and the SRI field is associated with the first SRS resource set, the candidate parameter set of the first power control parameter of the first PUSCH transmission occasion may be learned. In this case, the first bit in the power control parameter indicator field indicates the first power control parameter of the PUSCH transmission occasion associated with the first SRS resource or SRS resource set, that is, a source of first target P0 for the first PUSCH transmission occasion. For example, "0" indicates that the first target P0 is from a first candidate set of the candidate parameter set, and "1" indicates that the first target P0 is from a second candidate set of the candidate parameter set. Then, the second bit and the third bit jointly indicate the first power control parameter of the PUSCH transmission occasion associated with the second SRS resource or SRS resource set, that is, a source of second target P0 for the second PUSCH transmission occasion. For example, "00" indicates that the second target P0 is from the first candidate set of the candidate parameter set, "01" indicates that the second target P0 is from 1st P0 in the second candidate set of the candidate parameter set, and "10" indicates that the second target P0 is from 2nd P0 in the second candidate set of the candidate parameter set.

For a case that the DCI includes one SRI field and the SRI field is associated with the second SRS resource set, the candidate parameter set of the first power control parameter of the second PUSCH transmission occasion may be learned. In this case, the first bit and the second bit in the power control parameter indicator field jointly indicate the first power control parameter of the PUSCH transmission occasion associated with the first SRS resource or SRS resource set, that is, a source of first target P0 for the first PUSCH transmission occasion. For example, "00" indicates that the first target P0 is from a first candidate set of the candidate parameter set, "01" indicates that the first target P0 is from 1st P0 in a second candidate set of the candidate parameter set, and "10" indicates that the first target P0 is from 2nd P0 in the second candidate set of the candidate parameter set. Then, the third bit indicates the first power control parameter of the PUSCH transmission occasion associated with the second SRS resource or SRS resource set, that is, a source of second target P0 for the second PUSCH transmission occasion. For example, "0" indicates that the second target P0 is from the first candidate set of the candidate parameter set, and "1" indicates that the second target P0 is from the second candidate set of the candidate parameter set.

In some embodiments, the first SRS resource set and the second SRS resource set are differentiated based on the following content:

an SRS resource set index size;
an SRS resource set configuration sequence;
a MAC CE indicator; or
configuration information of higher layer signaling.
For example, an SRS resource set with a large index is the first SRS resource set, and an SRS resource set with a small index is the second SRS resource set. An SRS resource set preferentially configured is the first SRS resource set, and an SRS resource set configured later is the second SRS resource set.

In addition, in some embodiments, the method further includes:

determining, by the terminal, a second power control parameter of a PUSCH transmission occasion.

Herein, the second power control parameter may be a path loss reference signal PL-RS. In the following embodiment, the second power control parameter may be directly replaced with the PL-RS. In some embodiments, another implementation of the second power control parameter may also be applied to this embodiment of this application. Details are not described herein again.

In some embodiments, the determining a second power control parameter of a PUSCH transmission occasion includes:

determining the second power control parameter of the PUSCH transmission occasion according to the downlink control information and an associated SRS resource or SRS resource set; or
determining the second power control parameter of the PUSCH transmission occasion according to at least one second power control parameter associated with a target transmission resource.

Herein, the target transmission resource may be a PUCCH resource or a CORESET. The terminal may determine the second power control parameter of the PUSCH transmission occasion based on the at least one second power control parameter associated with the target transmission resource, for example, a 1st second power control parameter in the at least one second power control parameter.

The terminal may also determine the second power control parameter of the PUSCH transmission occasion based on the received DCI and the SRS resource or SRS resource set associated with the PUSCH transmission occasion.

In some embodiments, the determining the second power control parameter of the PUSCH transmission occasion according to the downlink control information and an associated SRS resource or SRS resource set includes:

in a case that the downlink control information does not include an SRI field associated with a target SRS resource set, determining, in a second target parameter set, a second power control parameter of a PUSCH transmission occasion associated with a target SRS resource or resource set.

In some embodiments, the second target parameter set is a first target set in a first set list, and the target SRS resource or resource set belongs to the target SRS resource set.

Herein, in a case that the DCI does not include the SRI field associated with the target SRS resource set, the terminal can determine, in the first target set (the second target parameter set) in the first set list, the second power control parameter of the PUSCH transmission occasion associated with the target SRS resource or resource set (an SRS resource or resource set belonging to the target SRS resource set).

The first target set may be determined based on a predefined or preconfigured index, for example, a set whose index is 0 in the first set list. The first target set may be determined based on a predefined or preconfigured arrangement sequence, for example, a 1st set in the first set list. In some embodiments, the first target set is a first set list associated with the target SRS resource set.

For example, when the DCI does not include the SRI field associated with the first SRS resource set, a target PL-RS corresponding to the PUSCH transmission occasion associated with the SRS resource or SRS resource set in first SRS resource set is a PL-RS in a set whose index is 0 in the first set list. When the DCI does not include the SRI field associated with the second SRS resource set, a target PL-RS corresponding to the PUSCH transmission occasion associated with the SRS resource or SRS resource set in the second SRS resource set is a PL-RS in a set whose index is 0 or 1 in the first set list. For example, the second target parameter set is sri-PUSCH-power control, and is a PL-RS set obtained by using the existing SRI field or a predefined set index ID=0.

It is assumed that the network side device configures one first set list sri-PUSCH-MappingToAddModList including two sets SRI-PUSCH-PowerControl, which are respectively corresponding to indexes (sri-PUSCH-PowerControlId) 0 and 1. When the DCI for scheduling the PUSCH does not include any SRI field, a path loss reference signal corresponding to the PUSCH transmission occasion associated with the SRS resource or SRS resource set in the first SRS resource set is an associated path loss reference signal in SRI-PUSCH-PowerControl with sri-PUSCH-PowerControlId=0; and a path loss reference signal corresponding to the PUSCH transmission occasion associated with the SRS resource or resource set in the second SRS resource set is an associated path loss reference signal in SRI-PUSCH-PowerControl with sri-PUSCH-PowerControlId=1.

Because there may be a plurality of PL-RSs in the first target set, which PL-RS in the first target set is the target PL-RS may be determined in a predefined or preconfigured manner.

For example, when the DCI does not include the SRI field associated with the first SRS resource set, a target PL-RS corresponding to the PUSCH transmission occasion associated with the SRS resource or SRS resource set in the first SRS resource set is a 1st PL-RS in the first target set. When the DCI does not include the SRI field associated with the second SRS resource set, a target PL-RS corresponding to the PUSCH transmission occasion associated with the SRS resource or SRS resource set in the second SRS resource set is a 2nd PL-RS in the first target set. The first target set may be a set with an index 0 or a minimum index in the first set list. In addition, in some embodiments, the method further includes:

receiving a Medium Access Control (MAC) Control Element (CE), where the MAC CE includes a first field indicating to update power control parameter, and the first field indicating to update power control parameter indicates at least one set index and at least one parameter index; and updating a set corresponding to the at least one set index according to the first field indicating to update power control parameter and using the at least one parameter index.

Herein, in a set including a second power control parameter, a specific second power control parameter is indicated by using an index of the second power control parameter. In this way, the network side device updates the second power control parameter based on a requirement, and sends the MAC CE including the first field indicating to update power control parameter update. After receiving the MAC CE, the terminal updates a second power control parameter index by using the at least one parameter index of the MAC CE in the set corresponding to the at least one set index of the MAC CE.

The at least one set index is an index of a set in the first set list. In this case, the first set list is sri-PUSCH-Mapping-ToAddModList. The at least one parameter index is used to indicate an updated PL-RS index in the set corresponding to the at least one set index.

Figure 9:
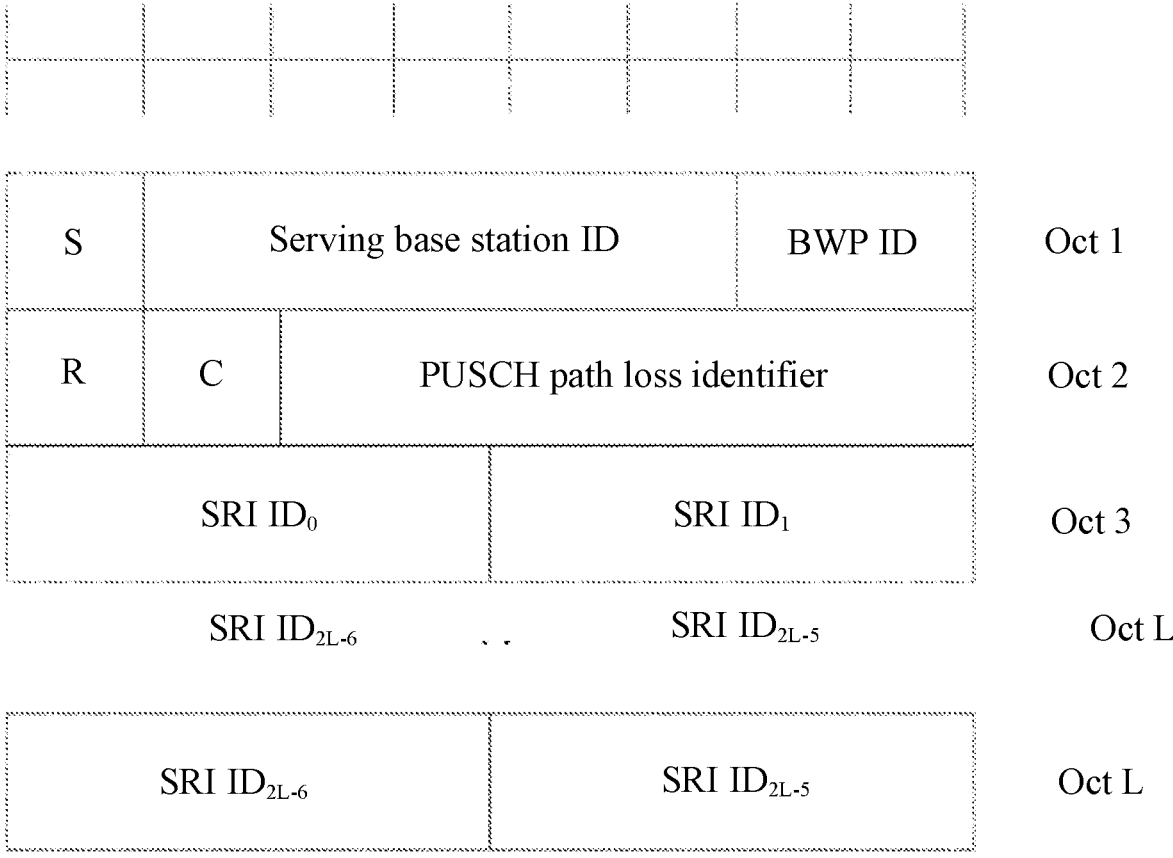
FIG. 9 is a schematic diagram of a format of a MAC CE according to an embodiment of this application.

For example, a format of the MAC CE is shown in FIG. 9. In the first field indicating to update power control parameter, each field used to indicate a set index is an SRI ID field, and each field used to indicate a parameter index is a PUSCH Path loss Reference RS ID field. In this way, assuming that an index value range of the set including the second power control parameter is 0 to 31, a length of each SRI ID field in the first field indicating to update power control parameter in the MAC CE is 5 bits.

In some embodiments, the MAC CE further includes a second power control parameter update indicator field, and the second power control parameter update indicator field indicates an SRS resource set associated with the set corresponding to the at least one set index or a set list to which the set corresponding to the at least one set index belongs.

In this way, an SRS resource set associated with the set corresponding to the at least one set index or a set list to which the set corresponding to the at least one set index belongs can be determined by using second power control parameter update indicator field. For example, the format of the MAC CE is shown in FIG. 9, and the second power control parameter update indicator field is an S field.

The second power control parameter update indicator field may be reusing a reserved field in the MAC CE or adding a new field.

In some embodiments, the second power control parameter update indicator field is "0", which indicates that the set corresponding to the at least one set index indicated by the first field indicating to update power control parameter in the MAC CE is associated with the first SRS resource set; or is "1", which indicates that the set corresponding to the at least one set index indicated by the first field indicating to update power control parameter in the MAC CE is associated with the second SRS resource set.

In some embodiments, the second power control parameter update indicator field is "0", which indicates that the set corresponding to the at least one set index indicated by the first field indicating to update power control parameter in the MAC CE belongs to the first set list, and the first set list is a first set list associated with a first SRS resource set or associated with a first SRI field; or is "1", which indicates that the set corresponding to the at least one set index indicated by the first field indicating to update power control parameter in the MAC CE belongs to the first set list, and the first set list is a first set list associated with a second SRS resource set or associated with a second SRI field.

In some embodiments, the second power control parameter update indicator field is "0", which indicates that the set corresponding to the at least one set index indicated by the first field indicating to update power control parameter in the MAC CE is associated with the first set list, and the first set list is a first set list associated with the first SRS resource set; or is "1", which indicates that the at least one parameter index indicated by the first field indicating to update power control parameter in the MAC CE is a corresponding parameter index used to update an $N^{th}$ set after the at least one set index.

In some embodiments, in a case that the second power control parameter update indicator field is a preset value, an N$^{th}$ set after the set corresponding to the at least one set index is updated according to the at least one parameter index, where N is a target offset value.

The preset value is 1. Assuming that N=2, and the set index indicated by the first field indicating to update power control parameter is 1, when the second power control parameter update indicator field is "1", a PL-RS index is updated to a PL-RS index indicated by the first field indicating to update power control parameter in a set whose set index is 3(1+2).

The target offset value is a total quantity of sets in a second target set list, and the second target set list is a first set list associated with a target SRS resource set.

If the target SRS resource set is the first SRS resource set, the target offset value is a quantity of all sets in a first set list associated with the first SRS resource set; or if the target SRS resource set is the second SRS resource set, the target offset value is a quantity of all sets in a first set list associated with the second SRS resource set.

In some embodiments, the target offset value may be configured by using higher layer signaling, or may be predefined, for example, N=16.

In some embodiments, the MAC CE further includes a third power control parameter update indicator field, and the third power control parameter update indicator field indicates an updated parameter identifier corresponding to the at least one parameter index in the set corresponding to the at least one set index.

In other words, in a case that the set corresponding to the at least one set index includes a plurality of parameter indexes, an identifier indicated by the third power control parameter update indicator field may be used to specify a specific update object.

Similarly, the third power control parameter update indicator field may be reusing a reserved field in the MAC CE or adding a new field.

In some embodiments, the third power control parameter update indicator field is "0", which indicates an associated 1st PL-RS index in a set indicated by an updated set index corresponding to the parameter index of the MAC CE; or is "1", which indicates an associated 2nd PL-RS index in a set indicated by an updated set index corresponding to the parameter index in the MAC CE.

With reference to the format of the MAC CE shown in FIG. 9, there are 2L-5 SRI IDs:

Example 1: The S field is "0", which indicates that SRI PUSCH power control indicated by an SRI ID, field belongs to the first set list sri-PUSCH-MappingToAddModList; or is "1", which indicates that SRI PUSCH power control indicated by an SRI ID, field belongs to another first set list sri-PUSCH-MappingToAddModList.

Example 2: The S field is "0", which indicates that an SRI ID, field indicates that SRI PUSCH power control associated with the first SRS resource set; or is "1", which indicates that an SRI ID, field indicates SRI PUSCH power control associated with the second SRS resource set.

Example 3: The S field is "0", which indicates that an SRI ID, field indicates SRI PUSCH power control associated with the first SRS resource set; or is "1", which indicates that an SRI ID, field indicates SRI PUSCH power control associated with the second SRS resource set.

For another field in the format of the MAC CE shown in FIG. 9, an R field is a reserved field, a C field indicates whether two SRI ID fields exist in the last byte of the MAC CE, a Serving CELL ID field is a serving cell identifier, and a Bandwidth Part (BWP) ID field is a BWP identifier.

It should be noted that, the power control parameter indication method provided in the embodiments of this application may be performed by a power control parameter indication apparatus, or a control module that is in the power control parameter indication apparatus and that is configured to perform and load the method. In the embodiments of this application, an example in which the power control parameter indication apparatus performs and loads the power control parameter indication method is used to describe the power control parameter indication method provided in the embodiments of this application.

As shown in FIG. 3, an embodiment of this application provides a power control parameter indication apparatus, including:

a receiving module 310, configured to receive downlink control information; and a processing module 320, configured to perform power control according to the downlink control information, where the downlink control information includes at least one power control parameter indicator field, the power control parameter indicator field indicates first power control parameters of different physical uplink shared channel PUSCH transmission occasions, and the PUSCH transmission occasion is associated with a sounding reference signal SRS resource or SRS resource set.

In some embodiments, SRS resources or SRS resource sets associated with the different PUSCH transmission occasions are different.

In some embodiments, the downlink control information further includes an SRI field, and the SRI field indicates a candidate parameter set of a first power control parameter of a PUSCH transmission occasion associated with an SRS resource or SRS resource set.

In some embodiments, a candidate parameter set of a first power control parameter of at least one PUSCH transmission occasion in the different PUSCH transmission occasions is predefined or preconfigured.

In some embodiments, the candidate parameter set includes at least one of the following:

a first candidate set; or a second candidate set, where the first candidate set belongs to a first set list, and the second candidate set belongs to a second set list.

In some embodiments, the first set list and the second set list are respectively associated with SRS resource sets.

In some embodiments, a bit size of the power control parameter indicator field is 3 bits.

In some embodiments, in a case that the downlink control information does not include an SRI field, a first bit in the power control parameter indicator field indicates that a first target parameter set is a target candidate set, the target candidate set belongs to a first target set list, and the first target parameter set is a target parameter set of the first power control parameters of the different PUSCH transmission occasions;

a second bit in the power control parameter indicator field indicates a power control parameter that is in the current target candidate set and that is used as a first power control parameter of a first PUSCH transmission occasion when the current target candidate set indicated by the first bit belongs to a second set list, and an SRS resource or SRS resource set associated with the first PUSCH transmission occasion belongs to a first SRS resource set; and a third bit in the power control parameter indicator field indicates a power control parameter that is in the current target candidate set and that is used as a first power control parameter of a second PUSCH transmission occasion when the current target candidate set indicated by the first bit belongs to the second set list, and an SRS resource or SRS resource set associated with the second PUSCH transmission occasion belongs to a second SRS resource set.

In some embodiments, a first target set list to which a target candidate set corresponding to the first PUSCH transmission occasion belongs is the same as a first target set list to which a target candidate set corresponding to the second PUSCH transmission occasion belongs.

In some embodiments, a first target set list to which a target candidate set corresponding to the first PUSCH transmission occasion belongs is different from a first target set list to which a target candidate set corresponding to the second PUSCH transmission occasion belongs.

In some embodiments, the first bit is a most significant bit in the power control parameter indicator field.

In some embodiments, in a case that the downlink control information includes one SRI field, if the SRI field is associated with a first SRS resource set, a first bit in the power control parameter indicator field indicates a first power control parameter of a PUSCH transmission occasion associated with a first SRS resource or SRS resource set, and a second bit and a third bit jointly indicate a first power control parameter of a PUSCH transmission occasion associated with a second SRS resource or SRS resource set; or if the SRI field is associated with a second SRS resource set, a first bit and a second bit in the power control parameter indicator field jointly indicate a first power control parameter of a PUSCH transmission occasion associated with a first SRS resource or SRS resource set, and a third bit indicates a first power control parameter of a PUSCH transmission occasion associated with a second SRS resource or SRS resource set, where the first SRS resource or SRS resource set belongs to the first SRS resource set, and the second SRS resource or SRS resource set belongs to the second SRS resource set.

In some embodiments, the first SRS resource set and the second SRS resource set are differentiated based on the following content:

an SRS resource set index size;

an SRS resource set configuration sequence;

a MAC CE indicator; or configuration information of higher layer signaling.

In some embodiments, the apparatus further includes:

a determining module, configured to determine a second power control parameter of a PUSCH transmission occasion.

In some embodiments, the determining module is further configured to:

determine the second power control parameter of the PUSCH transmission occasion according to the downlink control information and an associated SRS resource or SRS resource set; or determine the second power control parameter of the PUSCH transmission occasion according to at least one second power control parameter associated with a target transmission resource.

In some embodiments, the determining module is further configured to:

in a case that the downlink control information does not include an SRI field associated with a target SRS resource set, determine, in a second target parameter set, a second power control parameter of a PUSCH transmission occasion associated with a target SRS resource or resource set.

In some embodiments, the second target parameter set is a first target set in a first set list, and the target SRS resource or resource set belongs to the target SRS resource set.

In some embodiments, the apparatus further includes:

a MAC CE receiving module, configured to receive a Medium Access Control control element MAC CE, where the MAC CE includes a first field indicating to update power control parameter, and the first field indicating to update power control parameter indicates at least one set index and at least one parameter index; and an updating module, configured to update a set corresponding to the at least one set index according to the first field indicating to update power control parameter and the at least one parameter index.

In some embodiments, the MAC CE further includes a second power control parameter update indicator field, and the second power control parameter update indicator field indicates an SRS resource set associated with the set corresponding to the at least one set index or a set list to which the set corresponding to the at least one set index belongs.

In some embodiments, in a case that the second power control parameter update indicator field is a preset value, an $N^{th}$ set after the set corresponding to the at least one set index is updated according to the at least one parameter index, where N is a target offset value.

In some embodiments, the target offset value is a total quantity of sets in a second target set list, and the second target set list is a first set list associated with a target SRS resource set.

In some embodiments, the MAC CE further includes a third power control parameter update indicator field, and the third power control parameter update indicator field indicates an identifier of a correspondingly updated parameter index in the at least one parameter index in the set corresponding to the at least one set index.

The DCI received by the apparatus includes at least one power control parameter indicator field, the power control parameter indicator field indicates first power control parameters of different PUSCH transmission occasions, and the PUSCH transmission occasion is associated with an SRS resource or SRS resource set. In this way, with reference to a correspondence between a TRP and an SRS resource or SRS resource set, when there are a plurality of TRPs, first power control parameters of PUSCH transmission occasions of the plurality of TRPs can be indicated by the DCI including the at least one power control parameter indicator field, so that transmission requirements of the plurality of TRPs can be met.

The power control parameter indication apparatus in this embodiment of this application may be an apparatus, an apparatus or an electronic device with an operating system, or may be a component, an integrated circuit, or a chip in a terminal. The apparatus or the electronic device may be a mobile terminal, or a non-mobile terminal. For example, the mobile terminal includes but is not limited to the types of the terminal 11 listed above, and the non-mobile terminal may be a server, a Network Attached Storage (NAS), a personal computer (PC), a television (TV), an automated teller machine, or a self-service machine. This is not specifically limited in the embodiments of this application.

The power control parameter indication apparatus provided in this embodiment of this application can implement the processes implemented by the terminal in the method embodiments in FIG. 2. To avoid repetition, details are not described herein again.

As shown in FIG. 4, an embodiment of this application provides a power control parameter indication method, including:

Step 401: A network side device sends downlink control information, where the downlink control information includes at least one power control parameter indicator field, the power control parameter indicator field indicates first power control parameters of different physical uplink shared channel PUSCH transmission occasions, and the PUSCH transmission occasion is associated with an SRS resource or SRS resource set.

Herein, the DCI sent by the network side device includes at least one power control parameter indicator field, the power control parameter indicator field indicates first power control parameters of different PUSCH transmission occasions, and the PUSCH transmission occasion is associated with an SRS resource or SRS resource set. In this way, a terminal receives the DCI. With reference to a correspondence between a TRP and an SRS resource or SRS resource set, when there are a plurality of TRPs, first power control parameters of PUSCH transmission occasions of the plurality of TRPs can be indicated by the DCI including the at least one power control parameter indicator field, so that transmission requirements of the plurality of TRPs can be met.

In some embodiments, SRS resources or SRS resource sets associated with the different PUSCH transmission occasions are different.

In some embodiments, the downlink control information further includes an SRI field, and the SRI field indicates a candidate parameter set of a first power control parameter of a PUSCH transmission occasion associated with an SRS resource or SRS resource set.

In some embodiments, a candidate parameter set of a first power control parameter of at least one PUSCH transmission occasion in the different PUSCH transmission occasions is predefined or preconfigured.

In some embodiments, the candidate parameter set includes at least one of the following:

a first candidate set; or a second candidate set, where the first candidate set belongs to a first set list, and the second candidate set belongs to a second set list.

In some embodiments, the first set list and the second set list are respectively associated with SRS resource sets.

In some embodiments, a bit size of the power control parameter indicator field is 3 bits.

In some embodiments, in a case that the downlink control information does not include an SRI field, a first bit in the power control parameter indicator field indicates that a first target parameter set is a target candidate set, the target candidate set belongs to a first target set list, and the first target parameter set is a target parameter set of the first power control parameters of the different PUSCH transmission occasions;

a second bit in the power control parameter indicator field indicates a power control parameter that is in the current target candidate set and that is used as a first power control parameter of a first PUSCH transmission occasion when the current target candidate set indicated by the first bit belongs to a second set list, and an SRS resource or SRS resource set associated with the first PUSCH transmission occasion belongs to a first SRS resource set; and a third bit in the power control parameter indicator field indicates a power control parameter that is in the current target candidate set and that is used as a first power control parameter of a second PUSCH transmission occasion when the current target candidate set indicated by the first bit belongs to the second set list, and an SRS resource or SRS resource set associated with the second PUSCH transmission occasion belongs to a second SRS resource set.

In some embodiments, a first target set list to which a target candidate set corresponding to the first PUSCH transmission occasion belongs is the same as a first target set list to which a target candidate set corresponding to the second PUSCH transmission occasion belongs.

In some embodiments, a first target set list to which a target candidate set corresponding to the first PUSCH transmission occasion belongs is different from a first target set list to which a target candidate set corresponding to the second PUSCH transmission occasion belongs.

In some embodiments, the first bit is a most significant bit in the power control parameter indicator field.

In some embodiments, in a case that the downlink control information includes one SRI field, if the SRI field is associated with a first SRS resource set, a first bit in the power control parameter indicator field indicates a first power control parameter of a PUSCH transmission occasion associated with a first SRS resource or SRS resource set, and a second bit and a third bit jointly indicate a first power control parameter of a PUSCH transmission occasion associated with a second SRS resource or SRS resource set; or if the SRI field is associated with a second SRS resource set, a first bit and a second bit in the power control parameter indicator field jointly indicate a first power control parameter of a PUSCH transmission occasion associated with a first SRS resource or SRS resource set, and a third bit indicates a first power control parameter of a PUSCH transmission occasion associated with a second SRS resource or SRS resource set, where the first SRS resource or SRS resource set belongs to the first SRS resource set, and the second SRS resource or SRS resource set belongs to the second SRS resource set.

In some embodiments, the first SRS resource set and the second SRS resource set are differentiated based on the following content:

an SRS resource set index size;

an SRS resource set configuration sequence;

a MAC CE indicator; or configuration information of higher layer signaling.

In some embodiments, the method further includes:

sending a MAC CE, where the MAC CE includes a first field indicating to update power control parameter, and the first field indicating to update power control parameter indicates at least one set index and at least one parameter index.

In some embodiments, the MAC CE further includes a second power control parameter update indicator field, and the second power control parameter update indicator field indicates an SRS resource set associated with the set corresponding to the at least one set index or a set list to which the set corresponding to the at least one set index belongs.

In some embodiments, in a case that the second power control parameter update indicator field is a preset value, an $N^{th}$ set after the set corresponding to the at least one set index is updated according to the at least one parameter index, where N is a target offset value.

In some embodiments, the target offset value is a total quantity of sets in a second target set list, and the second target set list is a first set list associated with a target SRS resource set.

In some embodiments, the MAC CE further includes a third power control parameter update indicator field, and the third power control parameter update indicator field indicates an identifier of a correspondingly updated parameter index in the at least one parameter index in the set corresponding to the at least one set index.

The DCI sent in this method includes at least one power control parameter indicator field, the power control parameter indicator field indicates first power control parameters of different PUSCH transmission occasions, and the PUSCH transmission occasion is associated with an SRS resource or SRS resource set. In this way, a terminal receives the DCI. With reference to a correspondence between a TRP and an SRS resource or SRS resource set, when there are a plurality of TRPs, first power control parameters of PUSCH transmission occasions of the plurality of TRPs can be indicated by the DCI including the at least one power control parameter indicator field, so that transmission requirements of the plurality of TRPs can be met.

It should be noted that the method is implemented in cooperation with the foregoing power control parameter indication method performed by the terminal. The implementation of the foregoing power control parameter indication method embodiment performed by the terminal is applicable to this method, and a same technical effect can also be achieved.

Figure 5:
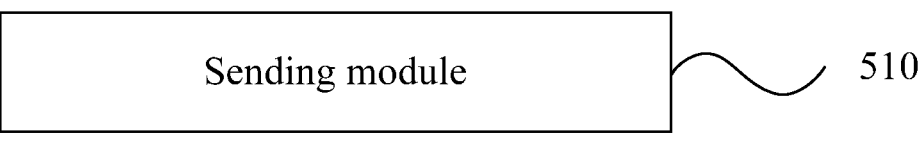
FIG. 5 is a structural diagram of an apparatus corresponding to FIG. 4.

As shown in FIG. 5, an embodiment of this application provides a power control parameter indication apparatus, including:

a sending module 510, configured to send downlink control information, where the downlink control information includes at least one power control parameter indicator field, the power control parameter indicator field indicates first power control parameters of different physical uplink shared channel PUSCH transmission occasions, and the PUSCH transmission occasion is associated with an SRS resource or SRS resource set.

In some embodiments, SRS resources or SRS resource sets associated with the different PUSCH transmission occasions are different.

In some embodiments, the downlink control information further includes an SRI field, and the SRI field indicates a candidate parameter set of a first power control parameter of a PUSCH transmission occasion associated with an SRS resource or SRS resource set.

In some embodiments, a candidate parameter set of a first power control parameter of at least one PUSCH transmission occasion in the different PUSCH transmission occasions is predefined or preconfigured.

In some embodiments, the candidate parameter set includes at least one of the following:

a first candidate set; or a second candidate set, where the first candidate set belongs to a first set list, and the second candidate set belongs to a second set list.

In some embodiments, the first set list and the second set list are respectively associated with SRS resource sets.

In some embodiments, a bit size of the power control parameter indicator field is 3 bits.

In some embodiments, in a case that the downlink control information does not include an SRI field, a first bit in the power control parameter indicator field indicates that a first target parameter set is a target candidate set, the target candidate set belongs to a first target set list, and the first target parameter set is a target parameter set of the first power control parameters of the different PUSCH transmission occasions;

a second bit in the power control parameter indicator field indicates a power control parameter that is in the current target candidate set and that is used as a first power control parameter of a first PUSCH transmission occasion when the current target candidate set indicated by the first bit belongs to a second set list, and an SRS resource or SRS resource set associated with the first PUSCH transmission occasion belongs to a first SRS resource set; and a third bit in the power control parameter indicator field indicates a power control parameter that is in the current target candidate set and that is used as a first power control parameter of a second PUSCH transmission occasion when the current target candidate set indicated by the first bit belongs to the second set list, and an SRS resource or SRS resource set associated with the second PUSCH transmission occasion belongs to a second SRS resource set.

In some embodiments, a first target set list to which a target candidate set corresponding to the first PUSCH transmission occasion belongs is the same as a first target set list to which a target candidate set corresponding to the second PUSCH transmission occasion belongs.

In some embodiments, a first target set list to which a target candidate set corresponding to the first PUSCH transmission occasion belongs is different from a first target set list to which a target candidate set corresponding to the second PUSCH transmission occasion belongs.

In some embodiments, the first bit is a most significant bit in the power control parameter indicator field.

In some embodiments, in a case that the downlink control information includes one SRI field, if the SRI field is associated with a first SRS resource set, a first bit in the power control parameter indicator field indicates a first power control parameter of a PUSCH transmission occasion associated with a first SRS resource or SRS resource set, and a second bit and a third bit jointly indicate a first power control parameter of a PUSCH transmission occasion associated with a second SRS resource or SRS resource set; or if the SRI field is associated with a second SRS resource set, a first bit and a second bit in the power control parameter indicator field jointly indicate a first power control parameter of a PUSCH transmission occasion associated with a first SRS resource or SRS resource set, and a third bit indicates a first power control parameter of a PUSCH transmission occasion associated with a second SRS resource or SRS resource set, where the first SRS resource or SRS resource set belongs to the first SRS resource set, and the second SRS resource or SRS resource set belongs to the second SRS resource set.

In some embodiments, the first SRS resource set and the second SRS resource set are differentiated based on the following content:

an SRS resource set index size;

an SRS resource set configuration sequence;

a MAC CE indicator; or configuration information of higher layer signaling.

In some embodiments, the apparatus further includes:

a MAC CE sending module, configured to send a MAC CE, where the MAC CE includes a first field indicating to update power control parameter, and the first field indicating to update power control parameter indicates at least one set index and at least one parameter index.

In some embodiments, the MAC CE further includes a second power control parameter update indicator field, and the second power control parameter update indicator field indicates an SRS resource set associated with the set corresponding to the at least one set index or a set list to which the set corresponding to the at least one set index belongs.

In some embodiments, in a case that the second power control parameter update indicator field is a preset value, an $N^{th}$ set after the set corresponding to the at least one set index is updated according to the at least one parameter index, where N is a target offset value.

In some embodiments, the target offset value is a total quantity of sets in a second target set list, and the second target set list is a first set list associated with a target SRS resource set.

In some embodiments, the MAC CE further includes a third power control parameter update indicator field, and the third power control parameter update indicator field indicates an identifier of a correspondingly updated parameter index in the at least one parameter index in the set corresponding to the at least one set index.

The DCI sent by the apparatus includes at least one power control parameter indicator field, the power control parameter indicator field indicates first power control parameters of different PUSCH transmission occasions, and the PUSCH transmission occasion is associated with an SRS resource or SRS resource set. In this way, a terminal receives the DCI. With reference to a correspondence between a TRP and an SRS resource or SRS resource set, when there are a plurality of TRPs, first power control parameters of PUSCH transmission occasions of the plurality of TRPs can be indicated by the DCI including the at least one power control parameter indicator field, so that transmission requirements of the plurality of TRPs can be met.

The power control parameter indication apparatus in this embodiment of this application may be an apparatus, and the apparatus may be a network side device. For example, the network side device includes but is not limited to the foregoing listed types of the network side device 12. This is not specifically limited in this embodiment of this application.

The power control parameter indication apparatus provided in this embodiment of this application can implement the processes implemented by the network side device in the method embodiments in FIG. 4. To avoid repetition, details are not described herein again.

An embodiment of this application further provides a terminal, including a processor, a memory, and a program or an instruction that is stored in the memory and that can be run on the processor, where the program or the instruction is executed by the processor to implement the steps of the foregoing power control parameter indication method performed by the terminal.

An embodiment of this application further provides a network side device, including a processor, a memory, and a program or an instruction that is stored in the memory and that can be run on the processor, where the program or the instruction is executed by the processor to implement the steps of the foregoing power control parameter indication method performed by the network side device.

Figure 6:
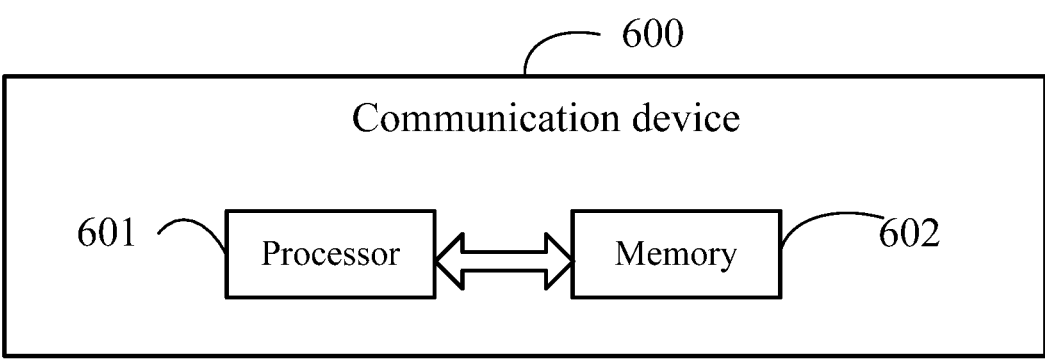
FIG. 6 is a structural diagram of a communication device according to an embodiment of this application.

In some embodiments, as shown in FIG. 6, this application further provides a communication device, including a processor 601, a memory 602, and a program or an instruction that is stored in the memory 602 and that can be run on the processor 601. For example, when the communication device 600 is a terminal, the program or the instruction is executed by the processor 601 to implement the processes of the foregoing power control parameter indication method embodiment performed by the terminal, and a same technical effect can be achieved. When the communication device 600 is a network side device, the program or the instruction is executed by the processor 601 to implement the processes of the foregoing power control parameter indication method embodiment performed by the network side device, and a same technical effect can be achieved. To avoid repetition, details are not described herein again.

An embodiment of this application further provides a terminal, including a processor and a communication interface, where the communication interface is configured to receive downlink control information, and the processor is configured to perform power control according to the downlink control information, where the downlink control information includes at least one power control parameter indicator field, the power control parameter indicator field indicates first power control parameters of different PUSCH transmission occasions, and the PUSCH transmission occasion is associated with a sounding reference signal SRS resource or SRS resource set.

Figure 7:
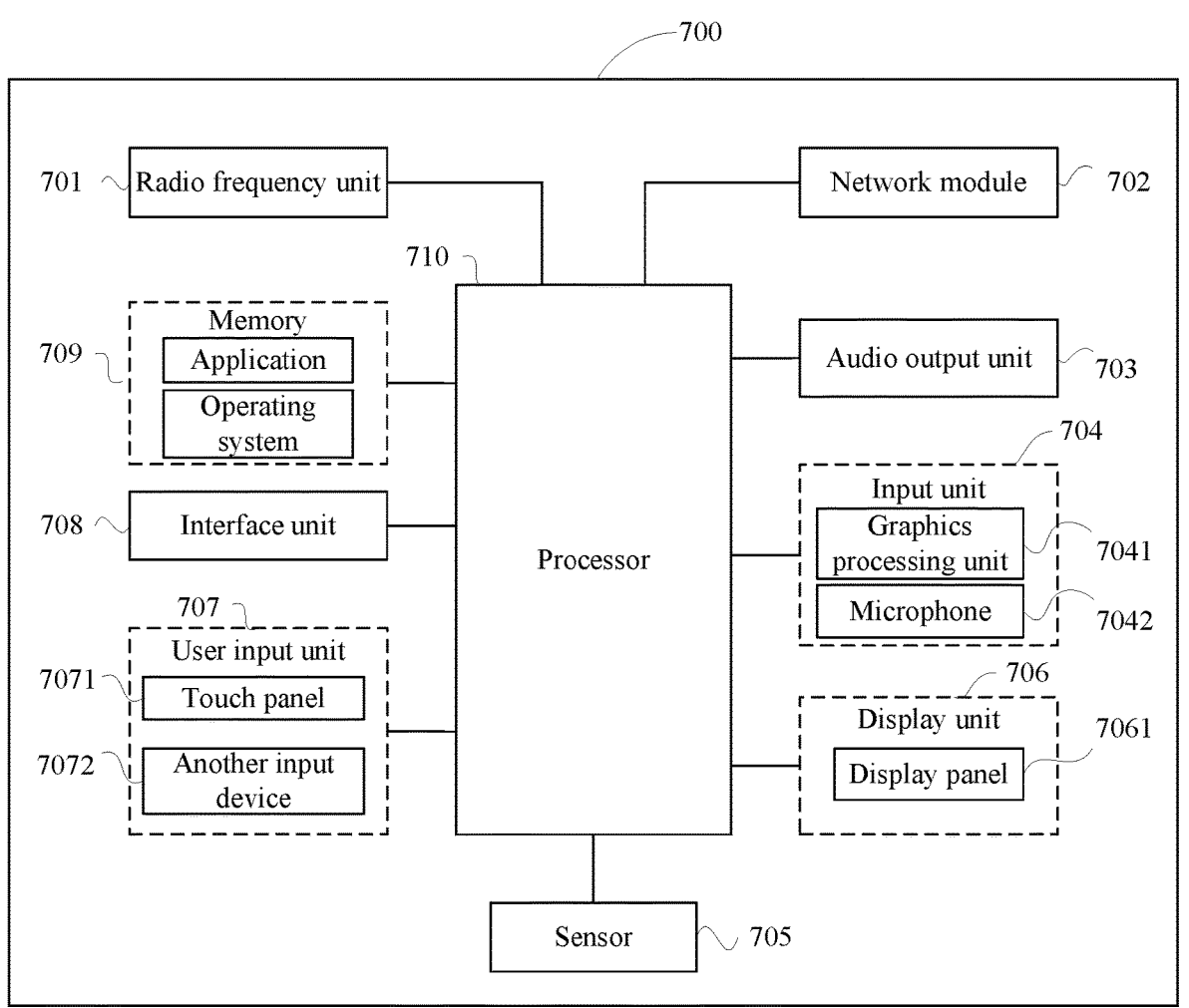
FIG. 7 is a structural diagram of a terminal according to an embodiment of this application.

This terminal embodiment corresponds to the foregoing method embodiment on the terminal side. Each implementation process and implementation of the foregoing method embodiment may be applicable to this terminal embodiment, and a same technical effect can be achieved. FIG. 7 is a schematic structural diagram of hardware of a terminal according to the embodiments of this application.

A terminal 700 includes but is not limited to at least a part of components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that, in this embodiment of this application, the input unit 704 may include a Graphics Processing Unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. In some embodiments, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, and may further include a non-volatile memory. The non-volatile memory may be a Read-only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 710 may include one or more processing units. In some embodiments, an application processor and a modem processor may be integrated into the processor 710. The application processor mainly processes an operating system, a user interface, an application, an instruction, or the like. The modem processor mainly processes wireless communication, for example, a baseband processor. It can be understood that, the modem processor may not be integrated into the processor 710.

The radio frequency unit 701 is configured to receive downlink control information; and the processor 710 is configured to perform power control according to the downlink control information, where the downlink control information includes at least one power control parameter indicator field, the power control parameter indicator field indicates first power control parameters of different physical uplink shared channel PUSCH transmission occasions, and the PUSCH transmission occasion is associated with a sounding reference signal SRS resource or SRS resource set.

The DCI received by the terminal includes at least one power control parameter indicator field, the power control parameter indicator field indicates first power control parameters of different PUSCH transmission occasions, and the PUSCH transmission occasion is associated with an SRS resource or SRS resource set. In this way, with reference to a correspondence between a TRP and an SRS resource or SRS resource set, when there are a plurality of TRPs, first power control parameters of PUSCH transmission occasions of the plurality of TRPs can be indicated by the DCI including the at least one power control parameter indicator field, so that transmission requirements of the plurality of TRPs can be met.

In some embodiments, the processor 710 is further configured to determine a second power control parameter of a PUSCH transmission occasion.

In some embodiments, the processor 710 is further configured to: determine the second power control parameter of the PUSCH transmission occasion according to the downlink control information and an associated SRS resource or SRS resource set; or determine the second power control parameter of the PUSCH transmission occasion according to at least one second power control parameter associated with a target transmission resource.

In some embodiments, the processor 710 is further configured to: in a case that the downlink control information does not include an SRI field associated with a target SRS resource set, determine, in a second target parameter set, a second power control parameter of a PUSCH transmission occasion associated with a target SRS resource or resource set.

In some embodiments, the second target parameter set is a first target set in a first set list, and the target SRS resource or resource set belongs to the target SRS resource set.

In some embodiments, the radio frequency unit 701 is further configured to receive a Medium Access Control control element MAC CE, where the MAC CE includes a first field indicating to update power control parameter, and the first field indicating to update power control parameter indicates at least one set index and at least one parameter index; and the processor 710 is further configured to update a set corresponding to the at least one set index according to the first field indicating to update power control parameter and the at least one parameter index.

An embodiment of this application further provides a network side device, including a processor and a communication interface, where the communication interface is configured to send downlink control information, where the downlink control information includes at least one power control parameter indicator field, the power control parameter indicator field indicates first power control parameters of different physical uplink shared channel PUSCH transmission occasions, and the PUSCH transmission occasion is associated with an SRS resource or SRS resource set. This network side device embodiment corresponds to the foregoing method embodiment on the network side device. Each implementation process and implementation of the foregoing method embodiment may be applicable to this network side device embodiment, and a same technical effect can be achieved.

Figure 8:
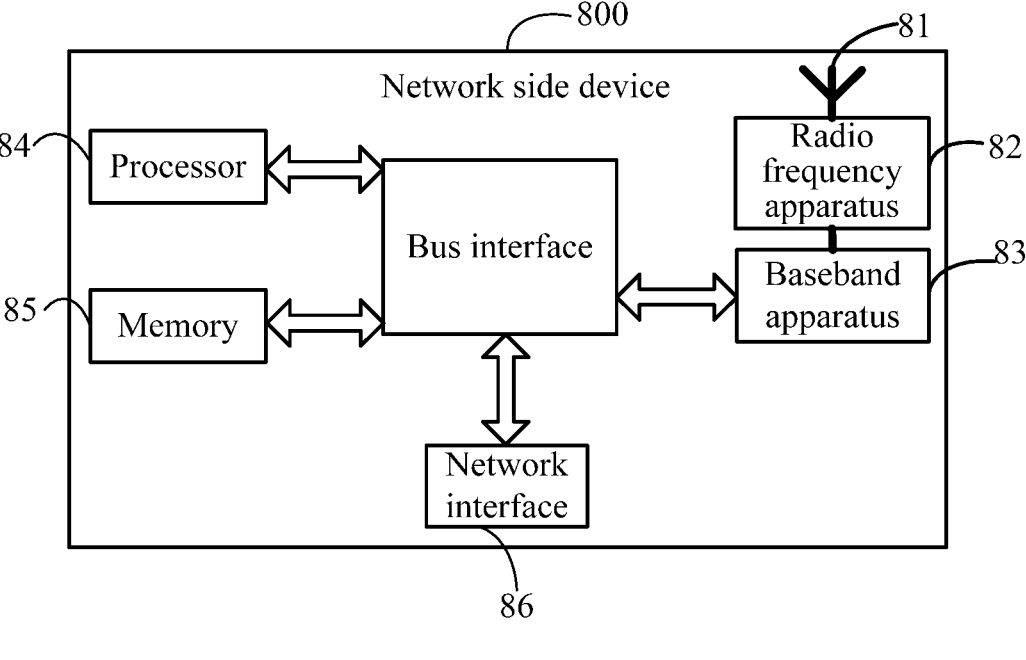
FIG. 8 is a structural diagram of a network side device according to an embodiment of this application.

Some embodiments of this application further provide a network side device. As shown in FIG. 8, a network device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes to-be-sent information, and sends the information to the radio frequency apparatus 82. The radio frequency apparatus 82 processes the received information and then sends the information by using the antenna 81.

The frequency band processing apparatus may be located in the baseband apparatus 83. The method performed by the network side device in the foregoing embodiment may be implemented in the baseband apparatus 83. The baseband apparatus 83 includes a processor 84 and a memory 85.

The baseband apparatus 83 may include, for example, at least one baseband board, where a plurality of chips are disposed on the baseband board. As shown in FIG. 8, one chip is, for example, the processor 84, which is connected to the memory 85, so as to invoke a program in the memory 85 to perform operations of the network device shown in the foregoing method embodiment.

The baseband apparatus 83 may further include a network interface 86, configured to exchange information with the radio frequency apparatus 82. For example, the interface is a common public radio interface (CPRI).

The network side device in embodiments of the present application further includes an instruction or a program that is stored in the memory 85 and that can be run on the processor 84. The processor 84 invokes the instruction or the program in the memory 85 to perform the method performed by the modules shown in FIG. 4, and a same technical effect is achieved. To avoid repetition, details are not described herein again.

An embodiment of this application further provides a readable storage medium. The readable storage medium stores a program or an instruction, and when the program or the instruction is executed by a processor, the processes of the foregoing power control parameter indication method embodiment are implemented and a same technical effect can be achieved. To avoid repetition, details are not described herein again.

The processor is a processor in the terminal in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing power control parameter indication method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the protection scope of the claims, all of which fall within the protection of this application.

The invention claimed is:

1. A method for power control parameter indication, comprising:

receiving, by a terminal, downlink control information, wherein the downlink control information comprises at least one power control parameter indicator field, the power control parameter indicator field indicating first power control parameters of different physical uplink shared channel (PUSCH) transmission occasions, wherein each first power control parameter comprises a power control parameter P0, and the different PUSCH transmission occasions are associated with sounding reference signal (SRS) resources in different SRS resource sets;

determining, by the terminal, a second power control parameter of a PUSCH transmission occasion, wherein the second power control parameter comprises a path loss reference signal (PL-RS), and the second power control parameter is determined according to the downlink control information and an SRS resource set associated with the PUSCH transmission occasion; or the second power control parameter is determined according to at least one power control parameter associated with a target transmission resource; and performing, by the terminal, power control according to the first power control parameter and the second power control parameter.

2. The method according to claim 1, wherein the downlink control information further comprises an SRS resource indicator SRI field, and the SRI field indicates a candidate parameter set of a first power control parameter of a PUSCH transmission occasion associated with an SRS resource set.

3. The method according to claim 1, wherein a candidate parameter set of a first power control parameter of at least one PUSCH transmission occasion in the different PUSCH transmission occasions is predefined or preconfigured.

4. The method according to claim 2, wherein the candidate parameter set comprises at least one of the following:

a first candidate set; or a second candidate set, wherein the first candidate set belongs to a first set list, and the second candidate set belongs to a second set list.

5. The method according to claim 4, wherein the first set list and the second set list are respectively associated with SRS resource sets.

6. The method according to claim 1, wherein a bit size of the power control parameter indicator field is 3 bits, wherein when the downlink control information does not comprise an SRI field, a first bit in the power control parameter indicator field indicates that a first target parameter set is a target candidate set, the target candidate set belongs to a first target set list, and the first target parameter set is a target parameter set of the first power control parameters of the different PUSCH transmission occasions;

a second bit in the power control parameter indicator field indicates a power control parameter that is in the current target candidate set and that is used as a first power control parameter of a first PUSCH transmission occasion when the current target candidate set indicated by the first bit belongs to a second set list, and an SRS resource or SRS resource set associated with the first PUSCH transmission occasion belongs to a first SRS resource set; and a third bit in the power control parameter indicator field indicates a power control parameter that is in the current target candidate set and that is used as a first power control parameter of a second PUSCH transmission occasion when the current target candidate set indicated by the first bit belongs to the second set list, and an SRS resource or SRS resource set associated with the second PUSCH transmission occasion belongs to a second SRS resource set.

7. The method according to claim 6, wherein a first target set list to which a target candidate set corresponding to the first PUSCH transmission occasion belongs is the same as a first target set list to which a target candidate set corresponding to the second PUSCH transmission occasion belongs.

8. The method according to claim 6, wherein a first target set list to which a target candidate set corresponding to the first PUSCH transmission occasion belongs is different from a first target set list to which a target candidate set corresponding to the second PUSCH transmission occasion belongs.

9. The method according to claim 6, wherein the first bit is a most significant bit in the power control parameter indicator field.

10. The method according to claim 1, wherein when the downlink control information comprises one SRI field, when the SRI field is associated with a first SRS resource set, a first bit in the power control parameter indicator field indicates a first power control parameter of a PUSCH transmission occasion associated with a first SRS resource or SRS resource set, and a second bit and a third bit jointly indicate a first power control parameter of a PUSCH transmission occasion associated with a second SRS resource or SRS resource set; or when the SRI field is associated with a second SRS resource set, a first bit and a second bit in the power control parameter indicator field jointly indicate a first power control parameter of a PUSCH transmission occasion associated with a first SRS resource or SRS resource set, and a third bit indicates a first power control parameter of a PUSCH transmission occasion associated with a second SRS resource or SRS resource set, wherein the first SRS resource or SRS resource set belongs to the first SRS resource set, and the second SRS resource or SRS resource set belongs to the second SRS resource set.

11. The method according to claim 1, wherein the first SRS resource set and the second SRS resource set are differentiated based on the following content:

an SRS resource set index size;

an SRS resource set configuration sequence;

a MAC CE indicator; or configuration information of higher layer signaling.

12. The method according to claim 1, wherein the determining the second power control parameter of the PUSCH transmission occasion according to the downlink control information and the SRS resource set associated with the PUSCH transmission occasion comprises:

when the downlink control information does not comprise an SRI field associated with a target SRS resource set, determining, in a second target parameter set, a second power control parameter of a PUSCH transmission occasion associated with a target SRS resource set, wherein the second target parameter set is a first target set in a first set list.

13. The method according to claim 1, further comprising:

receiving a Medium Access Control control element (MAC CE), wherein the MAC CE comprises a first field indicating to update power control parameter, and the first field indicating to update power control parameter indicates at least one set index and at least one parameter index; and updating a set corresponding to the at least one set index, according to the first field indicating to update power control parameter and using the at least one parameter index.

14. The method according to claim 13, wherein the MAC CE further comprises a second power control parameter update indicator field, and the second power control parameter update indicator field indicates an SRS resource set associated with the set corresponding to the at least one set index or a set list to which the set corresponding to the at least one set index belongs.

15. The method according to claim 14, wherein in a case that the second power control parameter update indicator field is a preset value, an $N^{th}$ set after the set corresponding to the at least one set index is updated according to the at least one parameter index, wherein N is a target offset value, wherein the target offset value is a total quantity of sets in a second target set list, and the second target set list is a first set list associated with a target SRS resource set.

16. The method according to claim 13, wherein the MAC CE further comprises a third power control parameter update indicator field, and the third power control parameter update indicator field indicates an identifier of a correspondingly updated parameter index in the at least one parameter index in the set corresponding to the at least one set index.

17. A terminal, comprising:

a memory storing a computer program; and a processor coupled to the memory and configured to execute the computer program to perform operations comprising:

receiving, by a terminal, downlink control information, wherein the downlink control information comprises at least one power control parameter indicator field, the power control parameter indicator field indicating first power control parameters of different physical uplink shared channel (PUSCH) transmission occasions, wherein each first power control parameter comprises a power control parameter P0, and the different PUSCH transmission occasions are associated with sounding reference signal (SRS) resources in different SRS resource sets;

determining, by the terminal, a second power control parameter of a PUSCH transmission occasion, wherein the second power control parameter comprises a path loss reference signal (PL-RS), and the second power control parameter is determined according to the downlink control information and an SRS resource set associated with the PUSCH transmission occasion; or the second power control parameter is determined according to at least one power control parameter associated with a target transmission resource; and performing, by the terminal, power control according to the first power control parameter and the second power control parameter.

18. A non-transitory computer-readable storage medium, storing a computer program, wherein the computer program, when executed by a processor of a terminal, causes the processor to perform operations comprising:

receiving, by a terminal, downlink control information, wherein the downlink control information comprises at least one power control parameter indicator field, the power control parameter indicator field indicating first power control parameters of different physical uplink shared channel (PUSCH) transmission occasions, wherein each first power control parameter comprises a power control parameter P0, and the different PUSCH transmission occasions are associated with sounding reference signal (SRS) resources in different SRS resource sets;

determining, by the terminal, a second power control parameter of a PUSCH transmission occasion, wherein the second power control parameter comprises a path loss reference signal (PL-RS), and the second power control parameter is determined according to the downlink control information and an SRS resource set associated with the PUSCH transmission occasion; or the second power control parameter is determined according to at least one power control parameter associated with a target transmission resource; and performing, by the terminal, power control according to the first power control parameter and the second power control parameter.

\* \* \* \* \*